Figure 1:
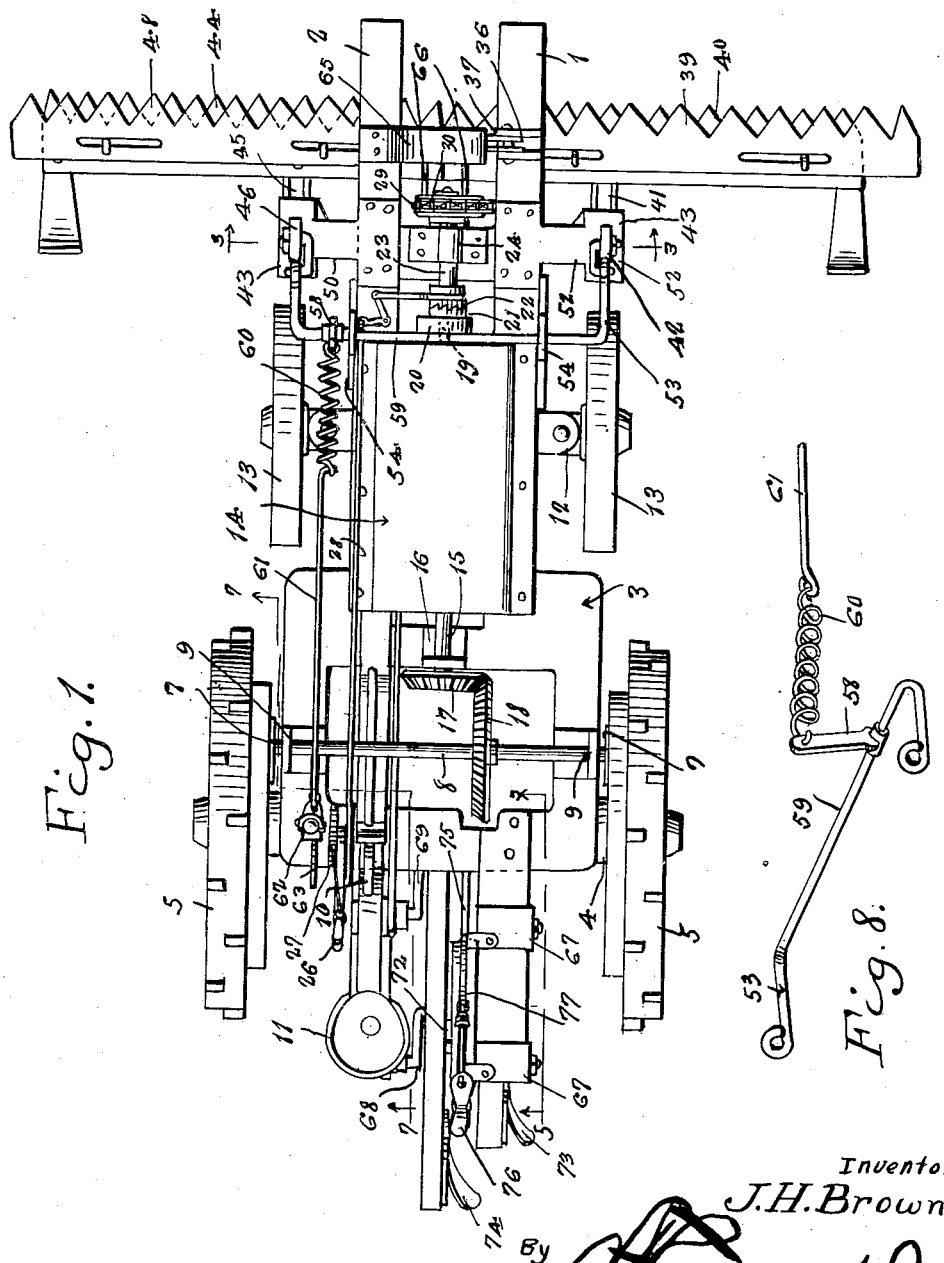

J. H. BROWN.
DOUBLE MOWER AND TWIN PLOW TRACTOR.
APPLICATION FILED DEC. 12, 1918.

1,332,799.

Patented Mar. 2, 1920.
3 SHEETS—SHEET 1.

Inventor
J. H. Brown.

J. H. BROWN.
DOUBLE MOWER AND TWIN PLOW TRACTOR.
APPLICATION FILED DEC. 12, 1918.
1,332,799.
Patented Mar. 2, 1920.
3 SHEETS—SHEET 2.
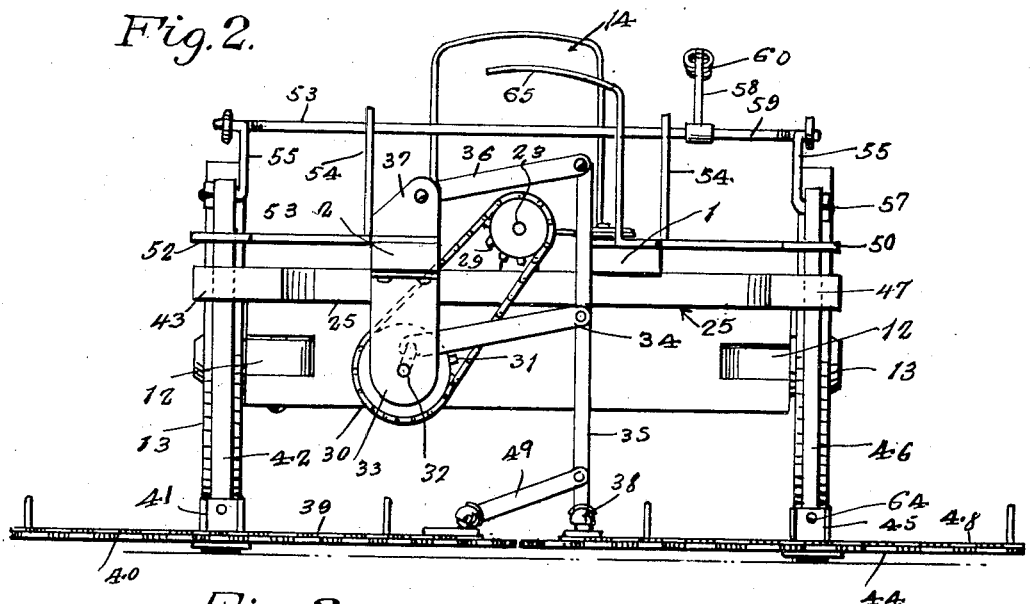
Fig. 2.
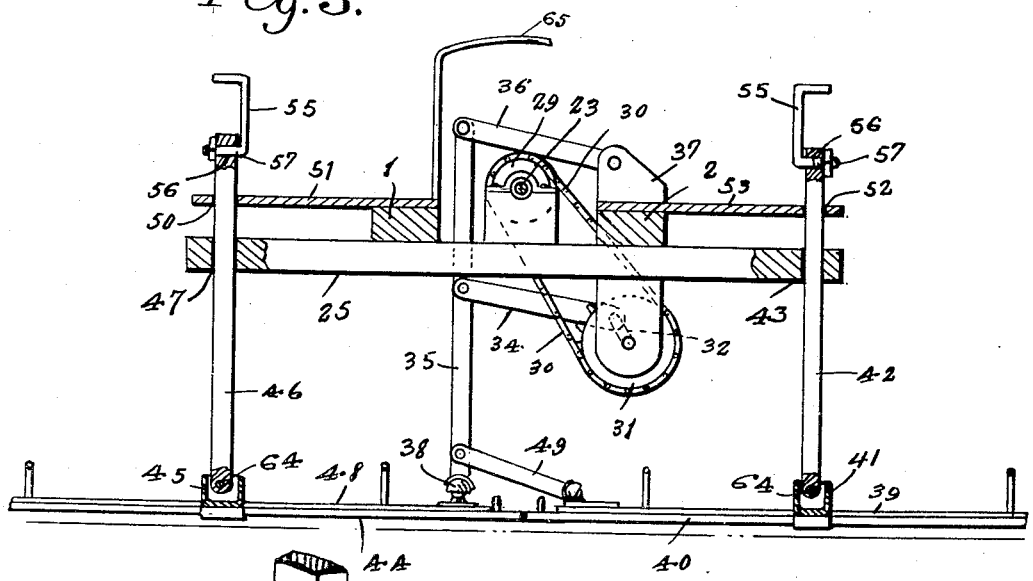
Fig. 3.
Fig. 4.
Inventor,
J. H. Brown.

J. H. BROWN.
DOUBLE MOWER AND TWIN PLOW TRACTOR.
APPLICATION FILED DEC. 12, 1918.
1,332,799.
Patented Mar. 2, 1920.
3 SHEETS—SHEET 3.
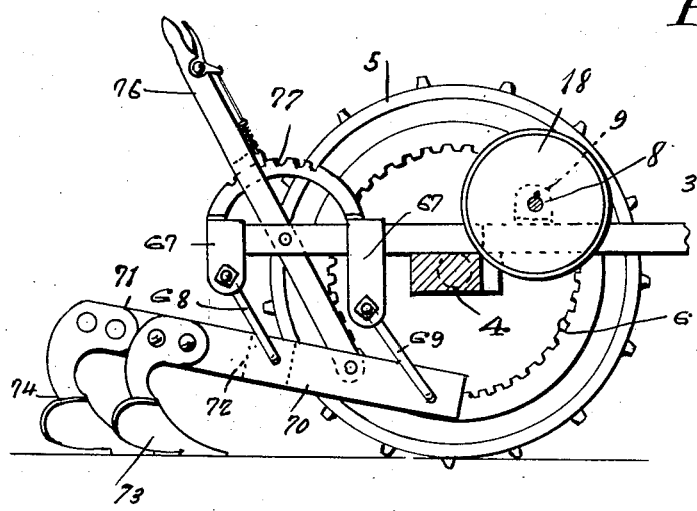
Fig. 5.
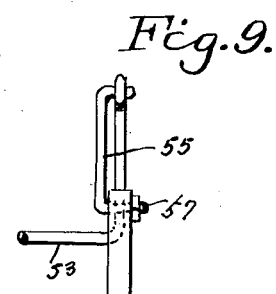
Fig. 9.
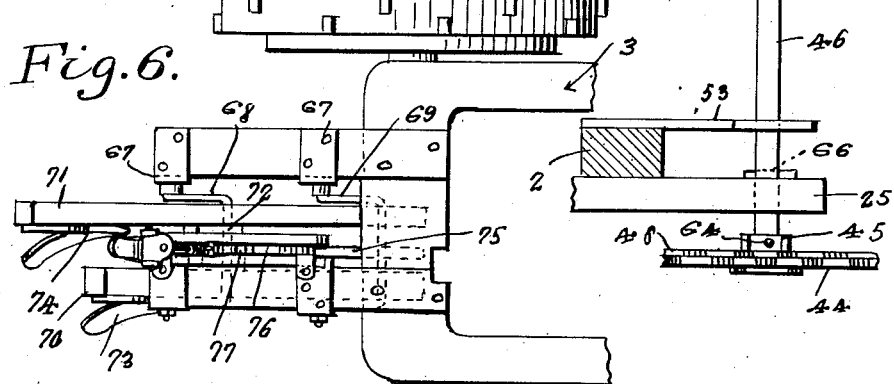
Fig. 6.
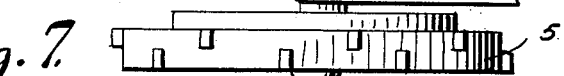
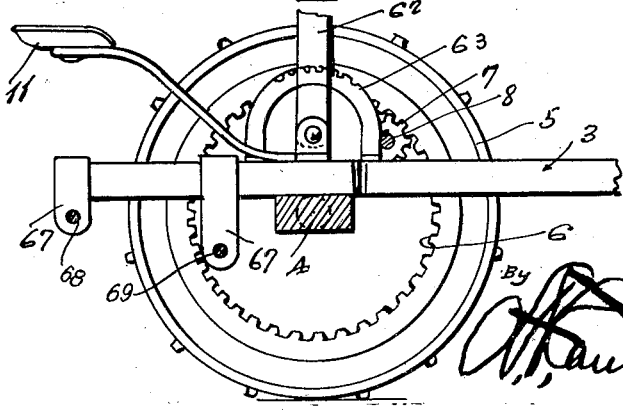
Fig. 7.
Inventor,
J. H. Brown.

UNITED STATES PATENT OFFICE.

JOHN HENRY BROWN, OF LARAMIE, WYOMING.

DOUBLE MOWER AND TWIN-PLOW TRACTOR.

1,332,799.     Specification of Letters Patent.     Patented Mar. 2, 1920.

Application filed December 12, 1918. Serial No. 266,472.

*To all whom it may concern:*

Be it known that I, JOHN HENRY BROWN, a citizen of the United States, residing at Laramie, in the county of Albany and State of Wyoming, have invented certain new and useful Improvements in Double Mowers and Twin-Plow Tractors; and I do hereby declare the following to be a full, clear, and exact description of the invention, such as will enable others skilled in the art to which it appertains to make and use the same.

This invention relates to agricultural machines, and more particularly to a tractor provided with plowing and mowing means.

One of the main objects of the invention is to provide a tractor which is equipped with mowing and plowing mechanisms which may be used independently of each other, these mechanisms being operated from the engine of the tractor.

A further object is to provide cutting or mowing means positioned at the front of the tractor frame and connected to the engine so as to be driven at relatively high speed.

A further object is to provide mowing means so mounted as to readily follow irregularities in the contour of the ground surface thus insuring uniform and even cutting.

Another object is to provide a floating mounting for the cutting means, means also being provided in connection with this mounting for raising the cutters into inoperative position and for securing them raised.

Another object is to provide an improved mounting for the plows which will insure that the plows will be retained in the ground during the plowing operation, this mounting being also adapted to facilitate movement of the plows into and out of operation.

Further objects will appear from the detailed description.

In the drawings—

Figure 1 is a top plan view of my improved tractor plow and mower constructed in accordance with my invention, Fig. 2 is a front view showing the cutting mechanism, Fig. 3 is a section taken substantially on line 3—3 of Fig. 1, Fig. 4 is a detail of the mounting of one of the cutter bar shoes and the standards therefor, Fig. 5 is a section taken substantially on line 5—5 of Fig. 1, showing the plow structure in side view, Fig. 6 is a plan view of the plow structure, the seat, steering rod, and the segment and lever for adjusting the cutters being omitted for clearness, Fig. 7 is a section taken substantially on line 7—7 of Fig. 1, Fig. 8 is a detail side view of the resilient connections for adjusting the cutters, Fig. 9 is a fragmentary front view showing the cutter bars and associated mechanism in inoperative or raised position.

The main frame of the tractor is of substantial rectangular outline and comprises the forwardly and rearwardly projecting side sills 1 and 2 each provided adjacent its rearward end with an inwardly directed substantially U-shaped element, these elements coöperating to provide a platform structure designated generally by 3. The platform 3 is supported by the rear axle 4 secured therebeneath, this axle being provided at each end with a ground wheel 5 rotatably mounted thereon.

Each of the ground wheels is provided, on its inner face with a concentric ring gear 6 which is interiorly threaded and meshes with a spur pinion 7 secured on the outer end of a transverse counter shaft 8 rotatably supported in bearing blocks 9 secured to the side sills of the platform. This shaft is rotated, in a manner to be described, so as to propel the vehicle, steering of the tractor being effected by means of the usual steering rod 10, the upper end of which is positioned adjacent a seat 11 of well known construction carried by the side sill adjacent the rearward end thereof, these steering rods being connected in the usual manner to rockably mounted wheel spindles provided at each end of the front axle 12, secured beneath the sills 1 and 2 the spindles carrying the front ground, and steering wheels 13. In this manner the tractor may be propelled and steered in the well known way.

An internal combustion engine of any preferred or suitable type, designated generally by 14 is supported by the sills 1 and 2 adjacent the front of platform 3. This engine is operatively connected by suitable transmission gearing such as that usually employed in automobiles, to a drive shaft 15 rotatably supported in the engine casing and in a standard 16 carried by the platform 3. The rotation of this shaft may be controlled by shifting the transmission gearing by means of levers mounted on the main frame and connected to the gears of the transmission in suitable manner, this gear shifting apparatus being of well known and common construction. A bevel pinion 17 is secured on the rearward end of drive shaft 15 and meshes with a bevel gear 18 secured on the counter shaft 8 thus establishing driving connection between the engine and the rear ground wheels 5 for propelling the vehicle.

The crank shaft 19 of the engine is extended forwardly of the crank casing and is provided adjacent its forward end with a pulley wheel 20 secured thereon. This pulley is provided on its outer or forward face with an integral clutch member 21 adapted to coact with a clutch member 22 feathered on a drive shaft 23 rotatably supported in a bearing standard 24 carried by a cross beam 25 secured beneath the sills 1 and 2, this drive shaft being in axial alinement with the crank shaft. The outer clutch member is adapted to be moved into and out of operative position through the medium of a lever 26 rockably mounted on sill 1 within easy reach of the operator upon the seat 11, this lever being provided with a detent coacting with a track 27 in the well known manner and connected to a shifting lever 28 rockably secured to the sill 2 and provided at its intermediate portion with a fork or bow by means of which the clutch member is loosely connected to this lever so as to be shifted thereby. In this manner, the shaft 23 may be readily connected to or disconnected from the drive shaft of the engine so as to be operated thereby.

The drive shaft 23 is provided at its outer end with a sprocket wheel 29 secured thereon and operatively connected by a chain 30 with a sprocket wheel 31 secured on a crank shaft 32 rotatably supported in spaced hangers 33 depending from cross beams 25 and sill 1. The crank of this shaft is connected by a link 34 to a substantially vertical link 35, the upper end of which is pivoted to a link 36 pivotally secured in a U-bracket 37 secured on the upper face of sill 1. The lower end of this link is connected by a ball and socket connection, indicated by 38, to the inner end of a transversely reciprocable cutter bar 48 which is mounted for reciprocation upon the upper face of a sickle bar 44 secured intermediate its ends to a supporting shoe 45 mounted upon the lower end of a standard 46 vertically slidable through an eye 47 provided at one end of the cross beam 25. A similar sickle bar 40 is positioned at the other side of the frame and is carried by a shoe 41 mounted on the lower end of a standard 42 slidable through an eye 43 at the other end of the cross beam 25.

The sickle bar 40 slidably receives a cutter bar 39 mounted for longitudinal reciprocation thereon in the well known manner, the inner end of this cutter bar being connected by a link 49 to the link 35, ball and socket connections being also employed in connection with this bar. When the crank shaft 32 is rotated the cutter bars will be reciprocated at high speed so as to cut or mow the grain in the well known manner. As will be clear from Fig. 2, the inner ends of the sickle bars abut, so as to extend the full distance between the two standards, and the cutter bars are movable the full length of the sickle bars so as to insure a clean cut over a strip corresponding in width to the combined lengths of the two sickle bars. In this manner, a very broad swath or strip may be cut at each trip of the tractor, and all side draft is eliminated by providing the two cutters extending equal distances to each side of the frame of the tractor.

A standard 46 is also slidable through a supplemental guide member or eye 50 supported by an arm 51 projecting laterally from the sill 1, the standard 42 being slidable through a similar eye 52 carried by an arm 53. The two pairs of eyes thus provided serve to brace the standards against all looseness or play and to insure accurate operation thereof during raising or lowering of the cutting mechanism. A substantially U-shaped adjusting yoke 53 is rockably mounted in supporting standards 54 carried by the sills 1 and 2 adjacent the forward end of the engine casing. The arms of this yoke are directed forwardly and are connected by links 55 to the upper ends of the standards, the standards being provided adjacent their upper ends with openings 56 which receive outwardly directed fingers 57 provided at the lower ends of the links 55 for this purpose. An arm 58 is rigidly secured to the bight portion 59 adjacent one of the standards 54 and projecting substantially radially of the yoke. The outer end of this arm is connected by a coil spring 60 to the forward end of a pull rod 61, the rearward end of which is secured to a lever 62 rockably supported by a rack 63 secured to side sill 2, the lever being provided with a detent coöperating with this rack in the well known manner for securing this lever in rocked adjustment. By rocking the yoke 53 in proper direction, the standards and the cutters carried thereby may be raised or lowered as desired or necessary, as will be understood.

As will be noted more clearly from Fig. 4, the shoe for supporting the cutter bar is pivotally secured on the lower end of the bar for rocking movement about an axis extending longitudinally of the tractor frame, by means of a pivot pin 64. The two cutter bars are thus mounted for rocking movement transversely of the frame, the weight of the connecting links and yoke at the inner ends of these bars being sufficient to hold them in proper relative position during operation of the cutting mechanism and coöperating with the pivotal mounting of the shoes to provide a light mounting for each of the cutting mechanisms which permits slight rocking movement of the same so as to accommodate undulations or irregularities in contour of the ground surface. Also, when the cutting mechanism is in lowered or operative position, the spring 60 is under slight tension thus providing a floating mounting for the cutters well adapted to permit slight vertical movement thereof for the accommodations of irregularities in the ground surface. When it is desired to raise the cutting mechanism into inoperative position, the adjusting lever 62 is rocked downwardly and rearwardly and secured in this position thus raising the standards of the sickle bars and associated parts. When this operation takes place, the link 36 is rocked upwardly about its pivotal axis so as to have its outer end brought into frictional engagement with the lower face of a transversely disposed resilient securing member 65 secured to the side sill 2, this member serving to limit upward movement of the link, thus preventing the inner ends of the sickle bars from moving upwardly beyond a desired amount and maintaining these members in a substantially horizontal position. When thus raised the standards of the sickle bars may be positively secured against downward movement by means of suitable securing pins inserted through openings 66 provided through the standards for this purpose, these openings being positioned above the lower guide members or eyes for the standards carried by the cross beams 25 when these standards are in full raised or inoperative position. Also, if desired, one of the standards may be thus positively secured in raised position, after which this standard may be disconnected from the adjusting yoke and the cutter bar supported by the sickle bar carried by this standard disconnected from the crank shaft 19, after which the remaining standards may be operated in the manner previously described so as to be raised or lowered out of or into operative position, as desired, for cutting at one side of the tractor only. This adjustment may be readily effected, after which the cutting mechanism will be operated in the manner described for cutting or mowing purposes. If desired, both of the cutting mechanisms may be secured in inoperative position, and the pulley 20 secured to the crank shaft 19 may be utilized for belt work for operating a grain thresher, saw-mill or other machines, it being understood that suitable guides may be provided for the belt in this case.

The sills 1 and 2 project rearwardly of the platform 3 and provide flower supporting members. These sills are provided with depending hangers 67 which are disposed in pairs, the hangers of each pair being in alinement transversely of the frame, and the inner pair of hangers being positioned adjacent the platform 3. The outer pair of hangers rockably support a U-member or yoke 68, a similar yoke 69 being rockably supported by the inner pair of hangers. These two yokes are of the same size, and, as will be noted more clearly from Fig. 5 of the drawings, the inner yoke 69 is mounted for rocking movement about an axis slightly lower than the axis of the outer yoke 68. These yokes have their bight portions loosely inserted through two spaced plow beams 70 and 71, and these beams are maintained in spaced parallel relation by a spacing block 72 secured therebetween, and the shorter beam 70 is provided at its rearward end with a plow 73 of any suitable or standard type secured thereto in the well known manner, the longer beam being provided with a similar plow mounted inside of and in rear of plow 73, these two plows being related so as to turn two parallel furrows during forward travel of the tractor, the plows being in lowered or operative position in the well known manner. As will be noted more clearly from Fig. 6, a member 75 is positioned between the plow beams 70 and 71 and has its ends connected loosely to the bight portions of the yokes. This member fits into the bifurcated lower end of hand lever 76 and is pivotally secured therein and this hand lever is pivotally mounted for rocking movement about a horizontal axis on the sill 1 and is provided with a detent which coöperates with a rack 77 in the well known manner to secure the lever in rocked adjustment. When the lever is rocked downwardly and rearwardly, the plow beams will be moved forwardly and upwardly so as to be positioned beneath the frame of the tractor and above the ground surface thus raising the plows into inoperative position and holding them out of contact with the ground. This operation, due to the differences in centers between the inner and the outer yokes, the forward ends of the plow beams will be depressed to a greater extent than the rearward ends thereof thus causing the plows to be tilted slightly upwardly and rearwardly so as to facilitate withdrawal of the same from the ground. Also, during the plowing operation, the yokes which support the plow beams will be normally at a slight downward and forward inclination thus insuring that the plows will be maintained in the ground, as the downward pull of the plows when moved forwardly through the ground will tend to move the yokes into vertical position thus lowering the plows and rendering it practically impossible for these plows to leave the ground due to the combined action of the hangers and the action of the plows themselves, since movement of the hangers or yokes to vertical position without lowering of the plows deeper into the ground could be accomplished only by bodily lifting the tractor which is highly improbable. For this reason, by supporting the plows in the manner above described, I insure that the plows will, during the plowing operation, be maintained at the proper depth in the soil, while also rendering it possible to insure very deep plowing. In addition, the plows may be readily raised in the manner set forth, as they are tilted slightly upwardly and rearwardly during the raising operation, being then moved forwardly and downwardly so as to occupy a position beneath the tractor frame.

It will be evident that there may be slight changes made in the construction and arrangement of the details of my invention without departing from the field and scope of the same, and I intend to include all such variations, as fall within the scope of the appended claims, in this application, in which a preferred form only of my invention is disclosed.

What I claim is:—

1. The combination with a portable frame, of cutting means carried thereby and extending transversely of the frame, said cutting means being mounted at approximately its central point for free rocking movement about an axis extending longitudinally of the frame, and means for operating said cutting means.

2. The combination with a portable supporting frame of two cutting mechanisms carried thereby and extending transversely of the frame, the inner ends of said mechanisms being positioned closely adjacent and said mechanisms being mounted at approximately their central points for independent free rocking movement about axes extending longitudinally of the frame, and means carried by the supporting frame for operating said cutting mechanisms so as to permit independent rocking movement thereof.

3. The combination with a tractor including a wheeled supporting frame and an engine supported thereby and operatively connected to the ground wheels of said frame for propelling the same, of supporting standards slidably mounted on the frame adjacent the forward end thereof for vertical movement, means for adjusting said standards, sickle bars carried by the standards at the lower ends thereof and extending transversely of the tractor frame, said sickle bars being mounted at approximately their longitudinal centers for independent rocking movement transversely of the frame, cutter bars slidably supported by sickle bars for reciprocation thereon, and means for operatively connecting said cutter bars to the engine of the tractor so as to be reciprocated thereby.

4. The combination with a tractor including a wheeled supported frame and an engine carried thereby and connected to the ground wheels of said frame for propelling the same, of supporting standards slidably supported by said frame for vertical movement adjacent each side and the forward end thereof, supporting shoes pivotally secured on the lower ends of said standards for rocking movement about axes extending longitudinally of the tractor frame, sickle bars secured to said shoes and extending transversely of the frame, cutter bars slidably mounted on said sickle bars for reciprocation longitudinally thereof, means for connecting said cutter bars to the engine of the tractor so as to be reciprocated thereby, said means being flexible to permit vertical adjustment of the sickle bars and to also permit independent rocking of said bars about the axes of said shoes, and means for adjusting said standards vertically, said means including an elastic connection to provide a floating mounting for the standards to permit vertical movement thereof in accordance with the variations in the ground surface.

5. The combination with a supporting frame, of sickle bars supported adjacent the forward end thereof for movement toward and away from the ground surface, cutter bars slidably supported by said sickle bars for reciprocation thereon, a drive shaft rotatably supported by said frame, a crank shaft rotatably supported by the frame, driving connections between said shaft, a link pivotally secured to the frame for rocking movement about a horizontal axis, a link having its upper end pivotally secured to the first mentioned link, connections between said crank shaft and link for rocking the link about its pivotal axis when the crank shaft is rotated, and connections between the links and the cutter bars for reciprocating said bars in accordance with rocking of said links.

In testimony whereof, I affix my signature in presence of two witnesses.

JOHN HENRY BROWN.

Witnesses:
  Mrs. KARL KOCH,
  IRENE HUNT.